US012737265B2

(12) United States Patent
Butterstein et al.

(10) Patent No.: US 12,737,265 B2
(45) **Date of Patent: *Sep. 15, 2026**

(54) RECOVERY OF A TARGET DATABASE SYSTEM

(71) Applicant: INTERNATIONAL BUSINESS MACHINES CORPORATION, Armonk, NY (US)

(72) Inventors: Dennis Butterstein, Leinfelden-Echterdingen (DE); Sabine Perathoner-Tschaffler, Nufringen (DE); Iliyana Ivanova, Boeblingen (DE); Christian Michel, Sindelfingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,875

(22) Filed: Jul. 9, 2024

(65) Prior Publication Data

US 2026/0017152 A1 Jan. 15, 2026

(30) Foreign Application Priority Data

Jul. 9, 2024 (GB) ..................................... 2408221

(51) Int. Cl.
*G06F 11/10* (2006.01)
*G06F 11/1446* (2026.01)
(Continued)

(52) U.S. Cl.
CPC ...... *G06F 11/1469* (2013.01); *G06F 11/1471* (2013.01); *G06F 16/2379* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 7,996,716 | B2 | 8/2011 | Butterworth |
| 11,249,983 | B2 | 2/2022 | Kumar et al. |

(Continued)

FOREIGN PATENT DOCUMENTS

| | | |
|---|---|---|
| CN | 103389927 A | 11/2013 |
| CN | 107229540 A | 10/2017 |

(Continued)

OTHER PUBLICATIONS

Intellectual Property Office, Patents Act 1977: Search Report under Section 17(5), Oct. 21, 2024, 3 Pages, GB Application No. 2408201.8.

(Continued)

*Primary Examiner* — Jau Shya Meng
(74) *Attorney, Agent, or Firm* — Rakesh Roy

(57) ABSTRACT

The method comprises: receiving multiple database tables from a source database system to form the target database system; receiving multiple batches of database transactions. The method further comprises repeatedly performing the following for a current batch of the multiple batches of database transactions: generating a single recovery bookmark before beginning processing of the current batch, wherein the single recovery bookmark comprises: an earliest open entry for the current batch, a latest commit entry for the current batch, and a latest commit entry for a next batch of the multiple batches of database transactions; performing the sequence of database transactions for the current batch; detecting a fault condition; recovering the target database system according to a recovery protocol using the single recovery bookmark; and resuming the performance of the sequence of database transactions for the current batch.

20 Claims, 6 Drawing Sheets

(51) Int. Cl.

| | |
|---|---|
| ***G06F 11/1471*** | (2026.01) |
| ***G06F 16/23*** | (2019.01) |

(56) References Cited

U.S. PATENT DOCUMENTS

| | | | | |
|---|---|---|---|---|
| 11,442,815 | B2 | 9/2022 | Kanp et al. | |
| 11,461,190 | B2 | 10/2022 | Shemer et al. | |
| 12,405,865 | B1 | 9/2025 | Butterstein et al. | |
| 2005/0071384 | A1* | 3/2005 | Cotner | G06F 16/2365 |
| 2011/0087637 | A1 | 4/2011 | Sundaram et al. | |
| 2013/0173558 | A1 | 7/2013 | Whisenant et al. | |
| 2017/0255528 | A1 | 9/2017 | Kedia et al. | |
| 2017/0255529 | A1 | 9/2017 | Kedia et al. | |
| 2019/0294723 | A1 | 9/2019 | Kedia et al. | |
| 2020/0320059 | A1 | 10/2020 | Kumar et al. | |
| 2021/0064482 | A1 | 3/2021 | Shemer et al. | |
| 2021/0334168 | A1 | 10/2021 | Kanp et al. | |
| 2022/0382651 | A1 | 12/2022 | Lu et al. | |
| 2024/0256398 | A1* | 8/2024 | Manchale Sridhar | G06F 11/1469 |

FOREIGN PATENT DOCUMENTS

| | | | |
|---|---|---|---|
| GB | 2641730 | A | 12/2025 |
| GB | 2641733 | A | 12/2025 |
| WO | 2025/257632 | A1 | 12/2025 |

OTHER PUBLICATIONS

Intellectual Property Office, Patents Act 1977: Search Report under Section 17(5), Oct. 21, 2024, 3 Pages, GB Application No. 2408221.6.

IBM, "Smarter Business Dynamic Information with IBM InfoSphere Data Replication CDC", ibm.com/redbooks, Mar. 2012, 484 Pages, https://www.redbooks.ibm.com/redbooks/pdfs/sg247941.pdf.

International Searching Authority, "Notification of Transmittal of the International Search Report and the Written Opinion of the International Searching Authority, or Declaration," Patent Cooperation Treaty, Aug. 28, 2025, 6 pages, International Application No. PCT/IB2025/055030.

* cited by examiner

RECOVERY OF A TARGET DATABASE SYSTEM

BACKGROUND

The present invention relates to replication in database systems, in particular to analytics accelerators for database systems.

An analytics accelerator for a database system is a specialized tool or platform designed to significantly enhance the performance and efficiency of complex analytical queries and data processing tasks. By possibly utilizing advanced techniques such as in-memory processing, optimized storage, parallel computing, and/or intelligent indexing, the accelerator can rapidly process large volumes of data and deliver insights in real-time or near-real-time. This enables the performance sophisticated analytics, such as data mining, predictive modeling, and trend analysis, more quickly and effectively, thereby improving decision-making and operational efficiency across various functions.

SUMMARY

In one aspect a computer-implemented method of recovery of a target database system is disclosed. The method comprises receiving multiple database tables from a source database system to form the target database system. The method further comprises receiving multiple batches of database transactions. At least some of the multiple batches comprise a sequence of database transactions. In some examples, the multiple batches each comprise a sequence of database transactions.

The method further comprises repeatedly performing the following for a current batch of the multiple batches of database transactions and this is generating a single recovery bookmark before beginning processing of the current batch. The single recovery bookmark comprises: an earliest open entry for the current batch, a latest commit entry for the current batch, and a latest commit entry for the next batch of the multiple batches of database transactions. The method further comprises repeatedly performing the following for a current batch of the multiple batches of database transactions: performing the sequence of database transactions for the current batch. The method further comprises repeatedly performing the following for a current batch of the multiple batches of database transactions: detecting a fault condition during the performance of the sequence of database transactions for the current batch. The method further comprises repeatedly performing the following for a current batch of the multiple batches of database transactions: recovering the target database system according to a recovery protocol using the single recovery bookmark. The method further comprises repeatedly performing the following for a current batch of the multiple batches of database transactions: resuming the performance of the sequence database transactions for the current batch after recovery of the target database system.

In another aspect, a computer program product comprising a computer-readable storage medium having computer-readable program code embodied therewith is disclosed. The computer-readable program code is configured to implement an example of the computer-implemented method.

In another aspect, a computer system is disclosed. The computer system comprises a processor configured for controlling the computer system. The computer system further comprises a memory storing machine-executable instructions. Execution of the machine-executable instructions causes the processor to receive multiple database tables from the source database system to form the target database system. Execution of the instructions further causes the processor to receive multiple batches of database transactions. At least some of the multiple batches comprise a sequence of database transactions.

Execution of the instructions further causes the processor to repeatedly perform the following for a current batch of the multiple batches of database transactions: generate a single recovery bookmark before beginning processing of the current batch. The single recovery bookmark comprises: an earliest open entry for the current batch, a latest commit entry for the current batch, a latest commit entry for the next batch of the multiple batches of database transactions. Execution of the instructions further causes the processor to repeatedly perform the following for a current batch of the multiple batches of database transactions: perform the sequence database transactions for the current batch. Execution of the instructions further causes the processor to repeatedly perform the following for a current batch of the multiple batches of database transactions: detect a fault condition during the performance of the sequence of database transactions for the current batch. Execution of the instructions further causes the processor to repeatedly perform the following for a current batch of the multiple batches of database transactions: recover the target database system according to recovery protocol using the single recovery bookmark. Execution of the instructions further causes the processor to repeatedly perform the following for a current batch of the multiple batches of database transactions: resuming the performance of the sequence database transactions for the current batch after recovery of the target database system.

BRIEF DESCRIPTION OF THE DRAWINGS

In the following embodiments of the invention are explained in greater detail, by way of example only, making reference to the drawings in which.

DETAILED DESCRIPTION

Figure 1:
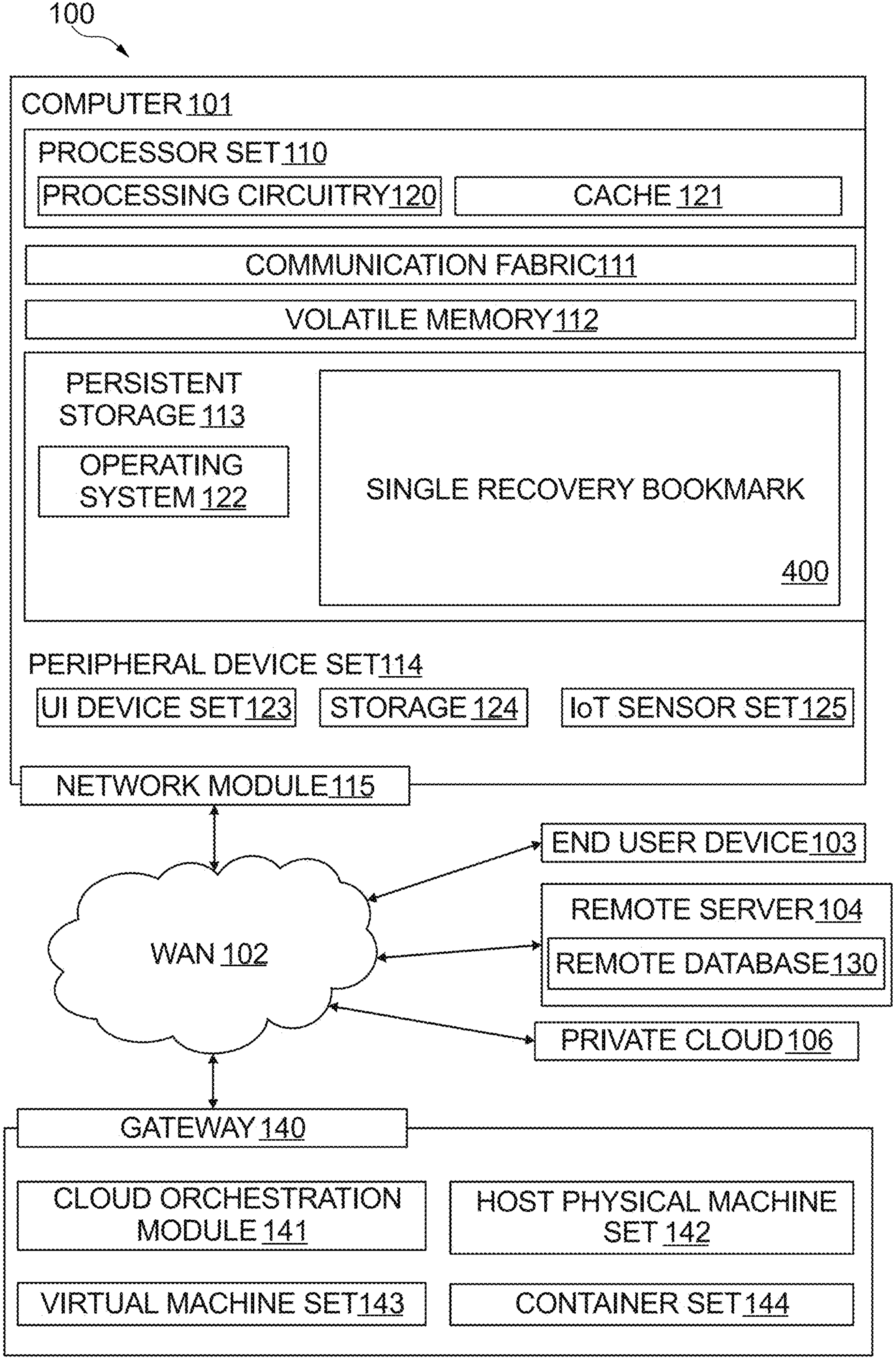
FIG. 1 illustrates an example of a computing environment.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one example a computer-implemented method of recovery of a target database system is disclosed. The method comprises receiving multiple database tables from the source database system to form the target database system. The target database system replicates the multiple database tables from the source database system. The method further comprises receiving multiple batches of database transactions. The database transactions may be transactions which were performed on the source database system. The multiple batches of database transactions may be received to replicate these changes to the target database system. At least some of the multiple batches comprise a sequence of database transactions. Often times, when changes are made to a source database system, multiple transactions may be performed as a group or batch. Individual batches of the database transactions may comprise a sequence of database transactions.

The method further comprises repeatedly performing the following for a current batch of the multiple batches of database transactions. In one step a single recovery bookmark is generated before beginning the processing of the current batch. The single recovery bookmark comprises an earliest open entry for the current batch, a latest commit entry for the current batch, and a latest commit entry for the next batch of the multiple batches of database transactions. These entries may be entries in the log of the source database. The earliest open entry may represent the first open entry in the log of the source database corresponding to transaction being begin. The latest commit entry may correspond to the latest or most recent commit entry for the current batch. The sequence of database transactions may be performed in parallel and/or be performed via different threads. They may therefore be started at different times and then have corresponding commit entries at later times.

A further step comprises performing the sequence of database transactions for the current batch. They may of course be performed sequentially, or they may be performed in parallel by multiple threads. A further step comprises detecting a fault condition during performance of the sequence of database transactions for the current batch. A fault condition as used herein represents a condition which may cause the interruption of the performance of the sequence of database transactions. The current batch further comprises recovering the target database system according to a recovery protocol using the single recovery bookmark. A further step comprises resuming the performance of the sequence of database transactions for the current batch after the recovery of the target database system. This example may be beneficial because it enables the further replication of the target database system without the need to recopy the multiple database tables from the source database system.

For example, if a fault was detected in the target database system conventional systems would halt the use of the target database system and then begin a copy of the multiple database tables again. This, however, may take a large amount of time and may also be expensive. Particularly, if the source database system is set up as a system for monitoring transactions in a real-time fashion, the source database system may be run with a high priority by a particular machine or server in which case it may be expensive or time-consuming to query the source database system again in order to copy the multiple database tables. As was mentioned, examples provide the benefit of avoiding the need for recopying the multiple database systems when a fault condition is detected.

In another example, the single recovery bookmark of the examples described herein may be embodied as a data structure, such as a computer-implemented data structure or data format embodied on a medium or as an electromagnetic carrier wave.

In another example, the source database comprises a transaction log. The earliest open entry is a first open transaction in the transaction log for the current batch. The latest commit entry is a latest commit transaction in the transaction log for the current batch. The latest commit entry of the next batch is a latest commit transaction in the transaction log for the next batch. This example may be beneficial because it describes how the transaction log of the source database can be used to construct a single recovery bookmark that enables the replication into the target database system even when a fault condition is detected.

In another example, the recovery protocol comprises reading the transaction log starting at the earliest open entry. The recovery protocol further comprises recording the sequence of database transactions not recorded as committed before the latest commit entry for the current batch into a list of open database transactions for the last committed transaction of the next batch. The recovery protocol further comprises completing transactions in a list of open database transactions. The recovery protocol further comprises updating the latest commit entry for the current batch when transactions in the list of open database transactions is completed. This example may be beneficial because it provides a means of resuming the replication into the target database system even when the fault condition has been detected.

In another example, the reading of the transaction log during the recovery protocol is halted at one log entry beyond the latest commit entry for the current batch or at the latest commit entry for the next batch of the multiple batches. This example in further detail illustrates one way of reading the transaction log which enables resumption of performance and sequence database transactions even when there is a fault detected.

In another example, the transactions in the list of open database transactions is completed using adaptive apply. Adaptive apply as disclosed herein is a system that is configured to replicate data from the source table to the target table if the source and target tables are not synchronized, but you want to replicate data from the source to the target without error. One maps the source table to your target table using the Adaptive Apply mapping type.

For example, if there is an insert on the source table, but that row already exists in the target table, then the replication system switches the insert to an update operation. Also, if there is an update on your source table, and this row does not exist on your target table, then the replication system switches the update into an insert.

Adaptive Apply ensures that replicated rows in the source and target tables are the same. One can also use Adaptive Apply to restore the contents of a target table from recorded journal or log entries. To do this, one sets the journal or log position to a specific entry or point in time, and then use Adaptive Apply to populate an empty target table with the latest data.

In another example, the current batch comprises a known number of database transactions. The method further comprises calculating the latest commit entry for a next batch of the multiple batches of database transactions by adding the known number of database transactions to the earliest open entry of the current batch. This may provide for a means of estimating the location of the latest commit entry for the next batch of the multiple batches of database transactions in the transaction log of the source database. This may for example assist in the construction of the single recovery bookmark.

In another example, the method further comprises replacing the single recovery bookmark when the current batch is completed and before beginning processing of the next batch of the multiple batches. During the process there is only ever a single recovery bookmark. This may for example provide for a more streamlined means of resuming the performance of the sequence of database transactions.

In another example the fault condition is any one of the following: a crash of the target database system, a restart of the target database system, a power failure in the target database system, and a hardware failure in the target database system. Any one of these situations may lead to a situation where the replication from the first database to the target database may fail. Examples may enable, in either of these situations, to resume the performance of the sequence of database transactions without the need to recopy the multiple database tables to reform the target database system.

In another example, the method of recovery of the target database system is a method of disaster recovery. For example, if there is a catastrophic failure of the communication between the target database system and the source database system or there is a catastrophic failure of the target database system, the system may nonetheless be recovered.

The method further comprises a replication of changes from the target database system back to the source database system after completion of the multiple batches of database transactions. For example, if during use of the target database system there are changes to the target database system these may then be replicated back to the multiple database tables.

In another example, the target database system implements an analytics accelerator for the source database system. If the multiple database tables are spread at multiple locations or for more multiple systems of the source database system, then it may be time-consuming or difficult to perform analytics on the multiple database tables. Copying them to the target database system may enable more rapid analytics.

In another example, the source database system is a transactional database system. For example, the source database system may be available for performing commercial transactions or other data operations which may be performed in real-time or within a certain delay. It may therefore be impractical to perform complex analytics on the multiple database tables where they are part of the source database system. They may for example interfere with the normal operation of the source database system.

In another example, at least part of the sequence of database transactions are parallel database transactions. This example is particularly beneficial because if there are parallel database transactions it may be difficult to unwind which changes were and were not made during the process of performing the current batch of the multiple batches of database transactions to update the target database system. The use of the single recovery bookmark enables the recovery of the target database system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for implementing the recovery of a target database system using a single recovery bookmark 400. In addition to block 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored with block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included with block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
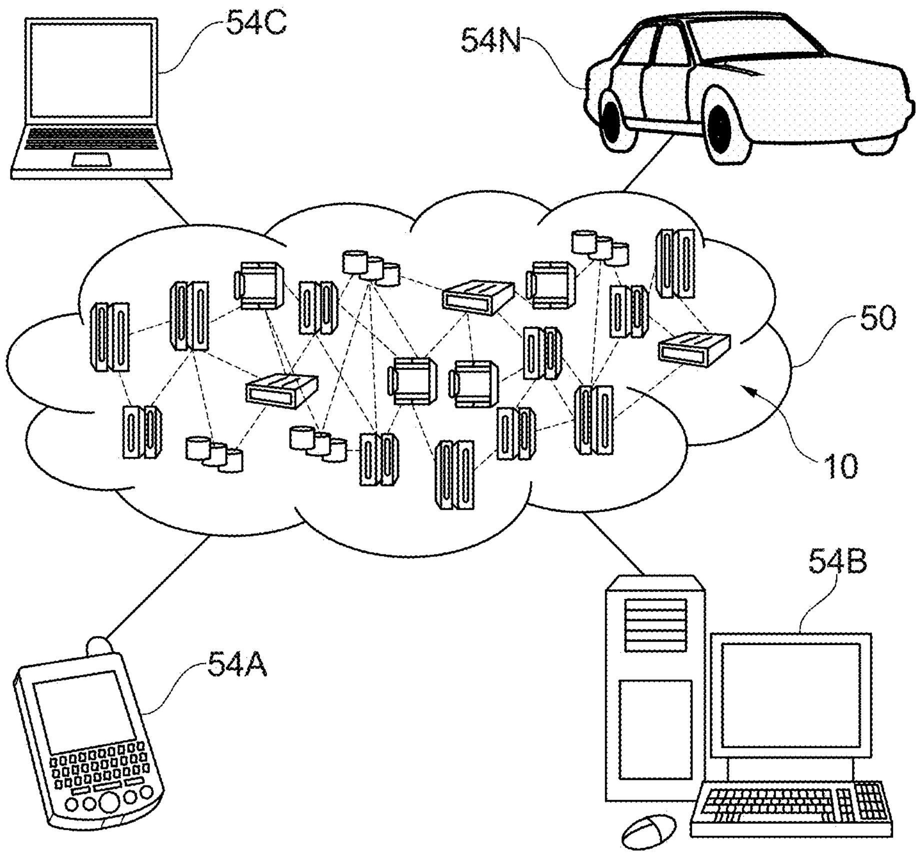
FIG. 2 depicts a cloud computing environment according to an example of the present invention.

FIG. 2 It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service. Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
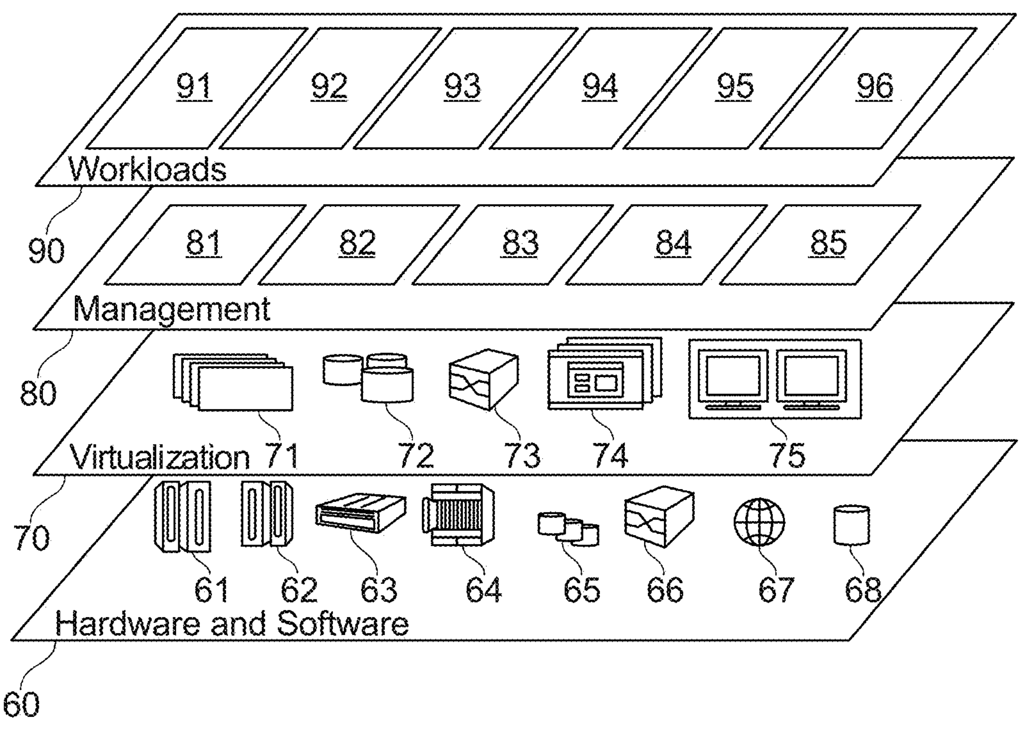
FIG. 3 depicts abstraction model layers according to an example of the present invention.

Referring now to FIG. 3, a set of functional abstraction layers provided by cloud computing environment 50 (FIG. 1) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. The database software 68 may for example be used to implement the source database and the target database as described above.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the implementation of a target database system 96 that uses a single recovery bookmark 400 as was described in the context of FIG. 1. In this example the target database system 96 may also provide data analytics processing.

Figure 4:
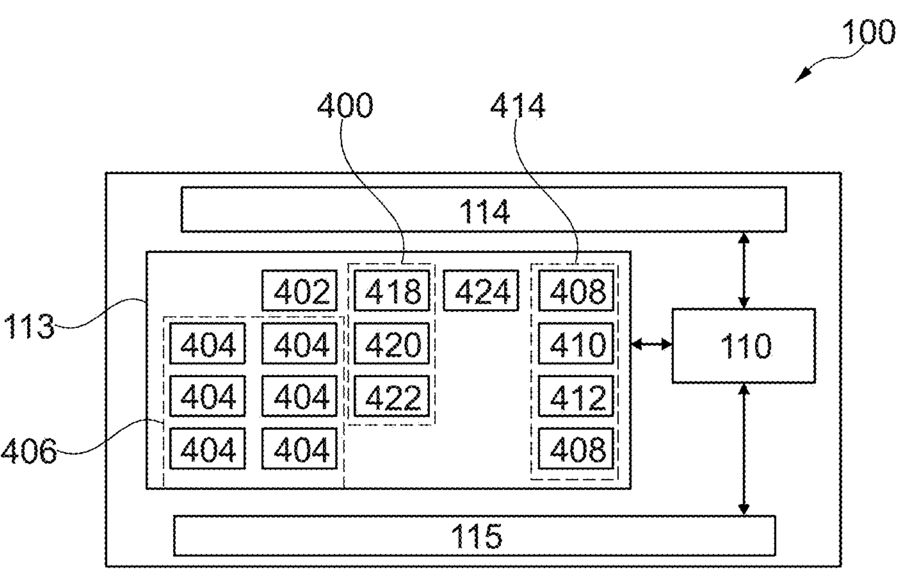
FIG. 4 shows a further view of the computing environment illustrated in FIG. 1.

FIG. 4 illustrates a further view of the computing environment 100. Not all of the components of the computing environment 100 illustrated in FIG. 1 are illustrated in FIG. 4. The persistent storage 113 is shown as storing an example of the single recovery bookmark 400. The single recovery bookmark 400 is shown as containing an earliest open entry for the current batch, a latest commit entry 420 for the current batch, and a latest commit entry 422 for the next batch. The persistent storage 113 is further shown as storing a database engine 402, which may be used to implement the target database system 96. There are a number of database tables 404 which form the copy of the multiple database tables 406 from the source database system. There are also multiple batches 414 of database transactions stored in the persistent storage 113. These may also have been received from the source database system. The multiple batches of database transactions 414 comprise a number of batches of database transactions 408 as well as the current batch 410 and the next batch 412. The persistent memory 113 is also shown as optionally containing the transaction log 424, which may have been copied from the source database system.

Figure 5:
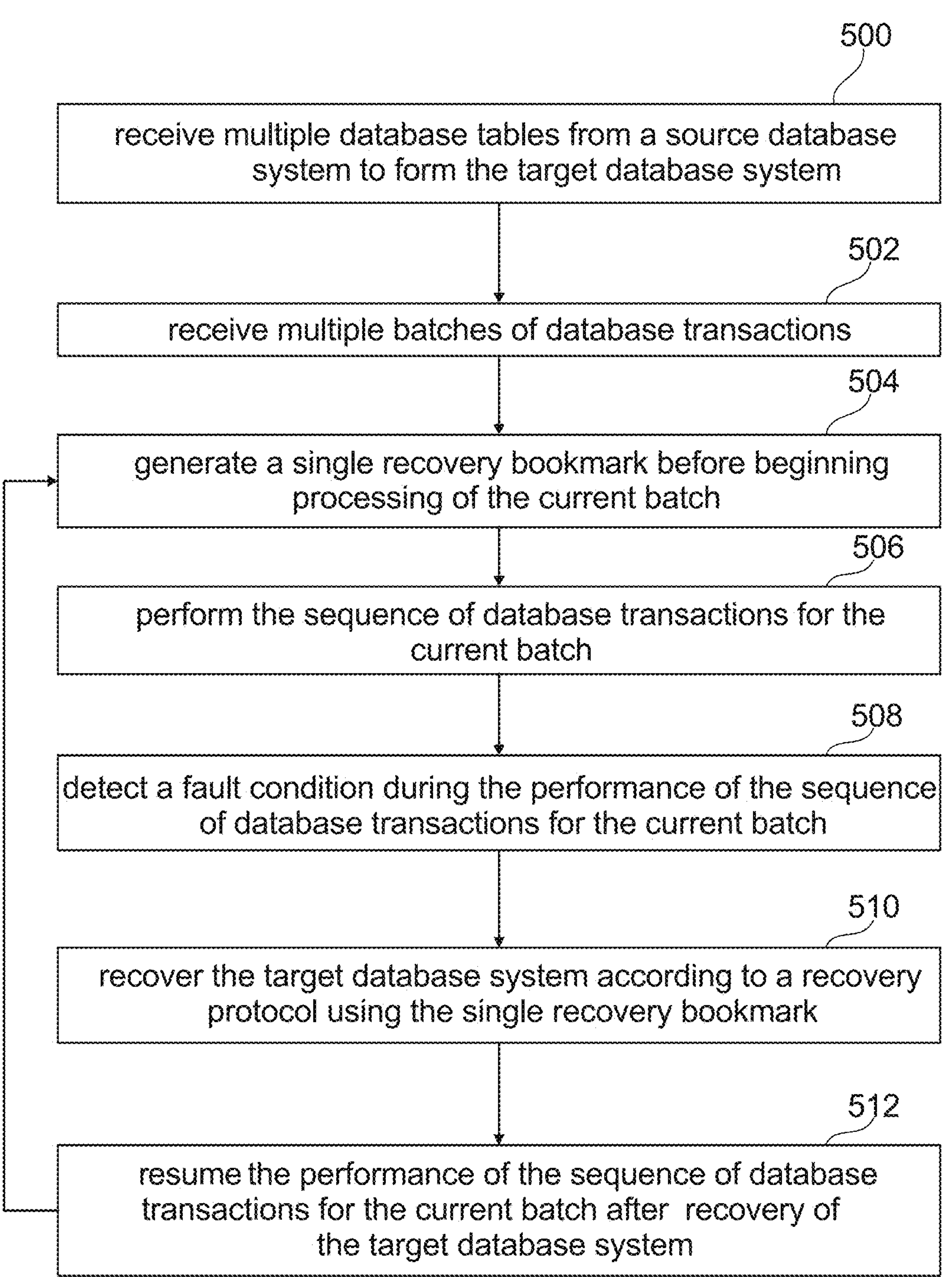
FIG. 5 shows a flow chart which illustrates a method of using the computing environment.

FIG. 5 shows a flowchart which illustrates a method of operating the computing environment 100. In step 500, the multiple database tables 406 are received from a source database system to form the target database system 96. In step 502 the multiple batches 414 of database transactions are received. Steps 504, 506, 508, 510, and 512 are performed for the current batch 410 of database transactions. After the current batch of database transactions 410 has been performed by these steps, the next batch of database transactions 412 is then set to the current batch 410 and steps 504, 506, 508, 510, and 512 are repeated.

In step 504 the single recovery bookmark 400 is generated before beginning processing of the current batch 410. This may for example be done by scanning or reading the transaction log 424. In step 506, the sequence of database transactions for the current batch 410 are performed. In step 508, a fault condition 426 is possibly detected. This fault condition 426 may be detected during the performance of the sequence of database transactions for the current batch 410. In step 510, the target database system 96 is recovered according to a recovery protocol 528 using the single recovery bookmark 400. In step 512, the performance of the sequence of database transactions for the current batch 410 is resumed after recovery of the target database system 96.

Examples may provide for a method to implement a bookmark recovery mechanism which prevents tables from being set to error in inconsistency scenarios by employing a corrective technique which is capable to correct inconsistent states in the target database.

To implement the corrective approach, a single recovery bookmark is used that comprises an: Earliest Open entry 400 for a current batch (n), a latest commit entry 420 for a current batch (n), and a latest commit entry for a next batch (n+1). In comparison to some other implementations, multiple bookmarks for each active thread and not needed, examples use just the single recovery bookmark 400.

Figure 6:
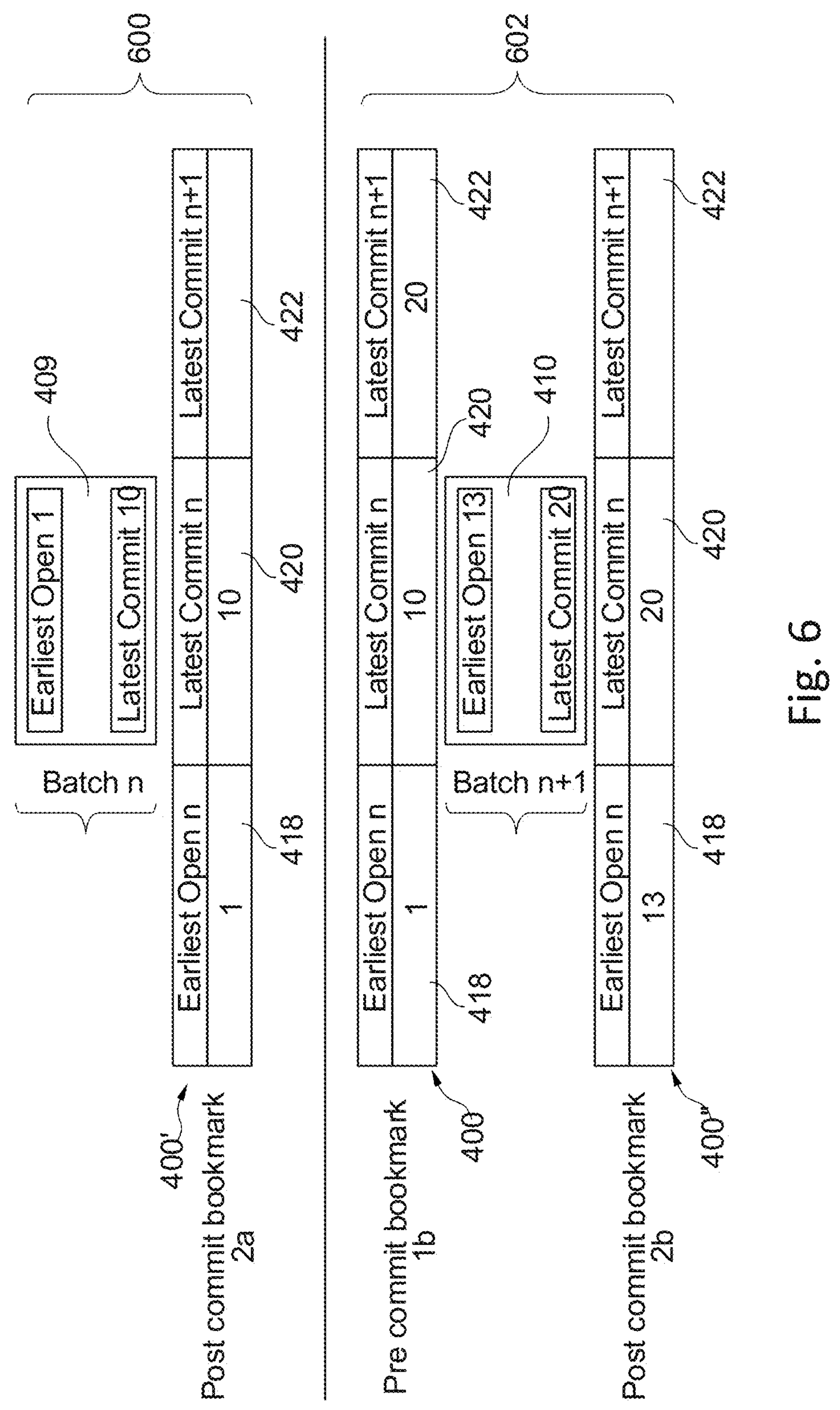
FIG. 6 illustrates the use of a single recovery bookmark.

FIG. 6 illustrates the use of the single recovery bookmark 400. Several views of the bookmark are shown and illustrated as 400, 400', and 400". 400 represents the single recovery bookmark before the current batch of database transactions 410 are committed. 400' represents the single recovery bookmark for the post-commit of the previous batch 600. The bookmark 400" represents the bookmark for the current batch 410 after the current batch of database transactions 410 have been committed. There is a previous batch of database transactions 409 and the current batch of database transactions 410. The bookmarks represented by the brackets 600 represent the previous batch 600 and the bracket 602 represents the bookmarks 400, 400" for the current batch 410.

Various examples may possibly be described by one or more of the following features in the following numbered clauses:

Clause 1. A computer implemented method of recovery of a target database system (96), the method comprising:

receiving (500) multiple database tables (406) from a source database system to form the target database system;

receiving (502) multiple batches (414) of database transactions, wherein at least some of the multiple batches comprise a sequence of database transactions;

wherein the method further comprises repeatedly performing the following for a current batch (410) of the multiple batches of database transactions:

generating (504) a single recovery bookmark (416) before beginning processing of the current batch, wherein the single recovery bookmark comprises: an earliest open entry (418) for the current batch, a latest commit entry (420) for the current batch, and a latest commit entry (422) for a next batch (412) of the multiple batches of database transactions;

performing (506) the sequence of database transactions for the current batch;

detecting (508) a fault condition (during the performance of the sequence of database transactions for the current batch;

recovering (510) the target database system according to a recovery protocol using the single recovery bookmark; and resuming (512) the performance of the sequence of database transactions for the current batch after recovery of the target database system.

Clause 2. The computer implemented method of clause 1, wherein the source database comprises a transaction log, wherein the earliest open entry is a first open transaction in the transaction log for the current batch, wherein the latest commit entry is a latest commit transaction in the transaction log for the current batch, wherein the latest commit entry of the next batch is a latest commit transaction in the transaction log for the next batch.

Clause 3. The computer implemented method of clause 2, wherein the recovery protocol comprises:

reading the transaction log starting at the earliest open entry;

recording the sequence of database transactions not recorded as committed before the latest commit entry for the current batch into a list of open database transactions for the last committed transaction of the next batch;

completing transactions in the list of open database transactions; and updating the latest commit entry for the current batch when transactions in the list of open database transactions is completed.

Clause 4. The computer implemented method of clause 3, wherein the reading of the transaction log during the recovery protocol is halted at one log entry beyond latest commit entry for the current batch or at the latest commit entry for the next batch of the multiple batches.

Clause 5. The computer implemented method of clause 3, 4, or 5, wherein the transactions in the list of open database transactions is completed using adaptive apply.

Clause 6. The computer implemented method of clause 3, 4, or 5, wherein the transactions in the list of open database transactions is completed by:

decomposing the transactions in the list of open database transactions into delete operations and insert operations before applying the transactions in the list of open database transactions; and performing the delete operation followed by the insert operation for transactions in the list of open database transactions.

Clause 7. The computer implemented method of any one of the preceding clauses, wherein the current batch comprise a known number of database transactions, wherein the method further comprises calculating the latest commit entry for a next batch of the multiple batches of database transactions by adding the known number of database transactions to the earliest open entry of the current batch.

Clause 8. The computer implemented method of any one of the preceding clauses, wherein the method further comprises replacing the single recovery bookmark when the current batch is completed and before beginning processing of the next batch of the multiple batches.

Clause 9. The computer implemented method of any one of the preceding clauses, wherein the fault condition is any one of the following: a crash of the target database system, a restart of the target database system, a power failure in the target database system, and hardware failure in the target database system.

Clause 10. The computer implemented method of any one of the preceding clauses, wherein the method of recovery of the target database system is a method of disaster recovery.

Clause 11. The computer implemented method of any one of the preceding clauses, wherein the method further comprises a replication of changes of the target database system back to the source database system after completion of the multiple batches of database transactions.

Clause 12. The computer implemented method of any one of the preceding clauses, wherein the method further comprises continually updating the target database via replication of the source database.

Clause 13. The computer implemented method of any one of the preceding clauses, wherein the target database system implements an analytics accelerator for the source database system.

Clause 14. The computer implemented method of any one of the preceding clauses, wherein the source database system is a transactional database system.

Clause 15. The computer implemented method of any one of the preceding clauses, wherein at least part of the sequence of database transactions are parallel database transactions.

Clause 16. A computer program product comprising one or more computer-readable storage medium having computer-readable program code embodied therewith, said computer-readable program code configured to implement the method of any one of clauses 1 through 14.

Clause 17. A computer system comprising:

a processor configured for controlling said computer system; and a memory storing machine executable instructions, execution of said instructions causes said processor to:

receive multiple database tables from a source database system to form the target database system;

receive multiple batches of database transactions, wherein at least some of the multiple batches comprise a sequence of database transactions;

wherein the execution of said instructions further causes said processor to repeatedly performing the following for a current batch of the multiple batches of database transactions:

generate a single recovery bookmark before beginning processing of the current batch, wherein the single recovery bookmark comprises: an earliest open entry for the current batch, a latest commit entry for the current batch, and a latest commit entry for a next batch of the multiple batches of database transactions;

perform the sequence of database transactions for the current batch;

detect a fault condition during the performance of the sequence of database transactions for the current batch;

recover the target database system according to a recovery protocol using the single recovery bookmark; and resume the performance of the sequence of database transactions for the current batch after recovery of the target database system.

Clause 18. The computer system of clause 17, wherein the source database comprises a transaction log, wherein the earliest open entry is a first open transaction in the transaction log for the current, wherein the latest commit entry is a latest commit transaction in the transaction log for the current batch, wherein the latest commit entry of the next batch is a latest commit transaction in the transaction log for the next batch.

Clause 19. The computer system of clause 18, wherein the recovery protocol comprises:

reading the transaction log starting at the earliest open entry;

recording the sequence of database transactions not recorded as committed before the latest commit entry for the current batch into a list of open database transactions for the last committed transaction of the next batch;

completing transactions in the list of open database transactions; and updating the latest commit entry for the current batch when transactions in the list of open database transactions is completed.

Clause 20. The computer system of clause 19, wherein the reading of the transaction log during the recovery protocol is halted at one log entry beyond latest commit entry for the current batch or at the latest commit entry for a next batch of the multiple batches.

Clause 21. A computer-implemented data structure, wherein the computer-implemented data structure comprises a single recovery bookmark, wherein the single recovery comprises: an earliest open entry for a current batch of multiple batches of database transactions, a latest commit entry for the current batch, and a latest commit entry for a next batch of the multiple batches of database transactions.

Clause 22. The computer-implemented data structure of clause 21, wherein the earliest open entry is a first open transaction in the transaction log for the current batch, wherein the latest commit entry is a latest commit transaction in the transaction log for the current batch, wherein the latest commit entry of the next batch is a latest commit transaction in the transaction log for the next batch.

What is claimed is:

1. A computer implemented method of recovery of a target database system, the method comprising:

receiving multiple database tables from a source database system to form the target database system;

receiving multiple batches of database transactions, wherein at least some of the multiple batches of database transactions comprise a sequence of database transactions;

wherein the method further comprises repeatedly performing the following for a current batch of the multiple batches of database transactions:

generating a single recovery bookmark before beginning processing of the current batch, wherein the single recovery bookmark comprises: an earliest open entry for the current batch, a latest commit entry for the current batch, and a latest commit entry for a next batch of the multiple batches of database transactions;

performing the sequence of database transactions for the current batch;

detecting a fault condition during the performance of the sequence of database transactions for the current batch;

recovering the target database system according to a recovery protocol using the single recovery bookmark; and resuming the performance of the sequence of database transactions for the current batch after recovery of the target database system.

2. The computer implemented method of claim 1, wherein the source database system comprises a transaction log, wherein the earliest open entry is a first open transaction in the transaction log for the current batch, wherein the latest commit entry for the current batch is a latest commit transaction in the transaction log for the current batch, wherein the latest commit entry of the next batch of the multiple batches of database transactions is a latest commit transaction in the transaction log for the next batch.

3. The computer implemented method of claim 2, wherein the recovery protocol comprises:

reading the transaction log starting at the earliest open entry;

recording the sequence of database transactions not recorded as committed before the latest commit entry for the current batch into a list of open database transactions for the latest commit transaction of the next batch;

completing transactions in the list of open database transactions; and updating the latest commit entry for the current batch based on the completed transactions in the list of open database transactions.

4. The computer implemented method of claim 3, wherein the reading of the transaction log during the recovery protocol is halted at one log entry beyond the latest commit entry for the current batch or at the latest commit entry for the next batch of the multiple batches of database transactions.

5. The computer implemented method of claim 3, wherein the transactions in the list of open database transactions is completed using adaptive apply.

6. The computer implemented method of claim 3, wherein the transactions in the list of open database transactions is completed by:

decomposing the transactions in the list of open database transactions into delete operations and insert operations before applying the transactions in the list of open database transactions; and performing the delete operations followed by the insert operations for the transactions in the list of open database transactions.

7. The computer implemented method of claim 1, wherein the current batch comprise a known number of database transactions, wherein the method further comprises calculating the latest commit entry for the next batch of the multiple batches of database transactions by adding the known number of database transactions to the earliest open entry of the current batch.

8. The computer implemented method of claim 1, wherein the method further comprises:

completing the current batch; and responsive to completing the current batch, replacing the single recovery bookmark before beginning processing of the next batch of the multiple batches of database transactions.

9. The computer implemented method of claim 1, wherein the fault condition is any one of the following: a crash of the target database system, a restart of the target database system, a power failure in the target database system, and hardware failure in the target database system.

10. The computer implemented method of claim 1, wherein the recovery of the target database system further comprises a method of disaster recovery.

11. The computer implemented method of claim 1, wherein the method further comprises a replication of changes of the target database system back to the source database system after completion of the multiple batches of database transactions.

12. The computer implemented method of claim 1, wherein the method further comprises continually updating the target database system via replication of the source database system.

13. The computer implemented method of claim 1, wherein the target database system implements an analytics accelerator for the source database system.

14. The computer implemented method of claim 1, wherein the source database system is a transactional database system.

15. The computer implemented method of claim 1, wherein at least part of the sequence of database transactions are parallel database transactions.

16. A computer program product comprising one or more computer-readable storage medium having computer-readable program code embodied therewith, said computer-readable program code configured to implement a method, comprising:

receiving multiple database tables from a source database system to form a target database system;

receiving multiple batches of database transactions, wherein at least some of the multiple batches of database transactions comprise a sequence of database transactions;

wherein the method further comprises repeatedly performing the following for a current batch of the multiple batches of database transactions:

generating a single recovery bookmark before beginning processing of the current batch, wherein the single recovery bookmark comprises: an earliest open entry for the current batch, a latest commit entry for the current batch, and a latest commit entry for a next batch of the multiple batches of database transactions;

performing the sequence of database transactions for the current batch;

detecting a fault condition during the performance of the sequence of database transactions for the current batch;

recovering the target database system according to a recovery protocol using the single recovery bookmark; and resuming the performance of the sequence of database transactions for the current batch after recovery of the target database system.

17. A computer system comprising:

a processor configured for controlling said computer system; and a memory storing machine executable instructions, execution of said instructions causes said processor to:

receive multiple database tables from a source database system to form a target database system;

receive multiple batches of database transactions, wherein at least some of the multiple batches comprise database transactions in a sequence of database transactions;

wherein the execution of said instructions further causes said processor to repeatedly perform the following for a current batch of the multiple batches of database transactions:

generate a single recovery bookmark before beginning processing of the current batch, wherein the single recovery bookmark comprises: an earliest open entry for the current batch, a latest commit entry for the current batch, and a latest commit entry for a next batch of the multiple batches of database transactions;

perform the sequence of database transactions for the current batch;

detect a fault condition during the performance of the sequence of database transactions for the current batch;

recover the target database system according to a recovery protocol using the single recovery bookmark; and resume the performance of the sequence of database transactions for the current batch after recovery of the target database system.

18. The computer system of claim 17, wherein the source database system comprises a transaction log, wherein the earliest open entry is a first open transaction in the transaction log for the current batch, wherein the latest commit entry for the current batch is a latest commit transaction in the transaction log for the current batch, wherein the latest commit entry of the next batch of the multiple batches of database transactions is a latest commit transaction in the transaction log for the next batch.

19. The computer system of claim 18, wherein the recovery protocol comprises:

reading the transaction log starting at the earliest open entry;

recording the sequence of database transactions not recorded as committed before the latest commit entry for the current batch into a list of open database transactions for the latest commit transaction of the next batch;

completing transactions in the list of open database transactions; and updating the latest commit entry for the current batch based on the completed transactions in the list of open database transactions.

20. The computer system of claim 19, wherein the reading of the transaction log during the recovery protocol is halted at one log entry beyond latest commit entry for the current batch or at the latest commit entry for the next batch of the multiple batches of database transactions.

* * * * *